Jan. 22, 1929.
J. A. SHIVELY
1,700,099
ATTACHMENT FOR CALENDERS
Filed Feb. 27, 1926    2 Sheets-Sheet 2
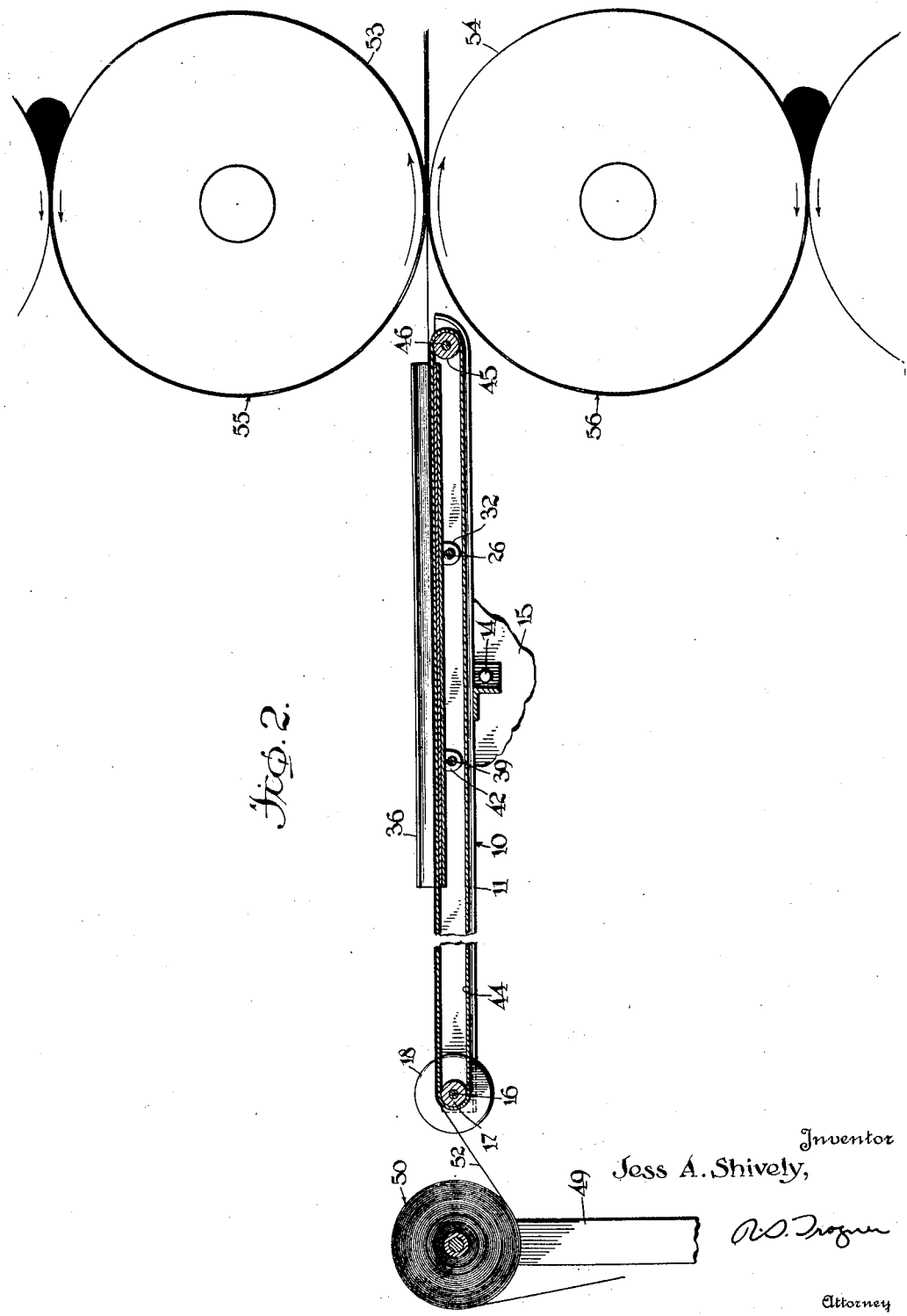
Inventor
Jess A. Shively,
Attorney Patented Jan. 22, 1929.

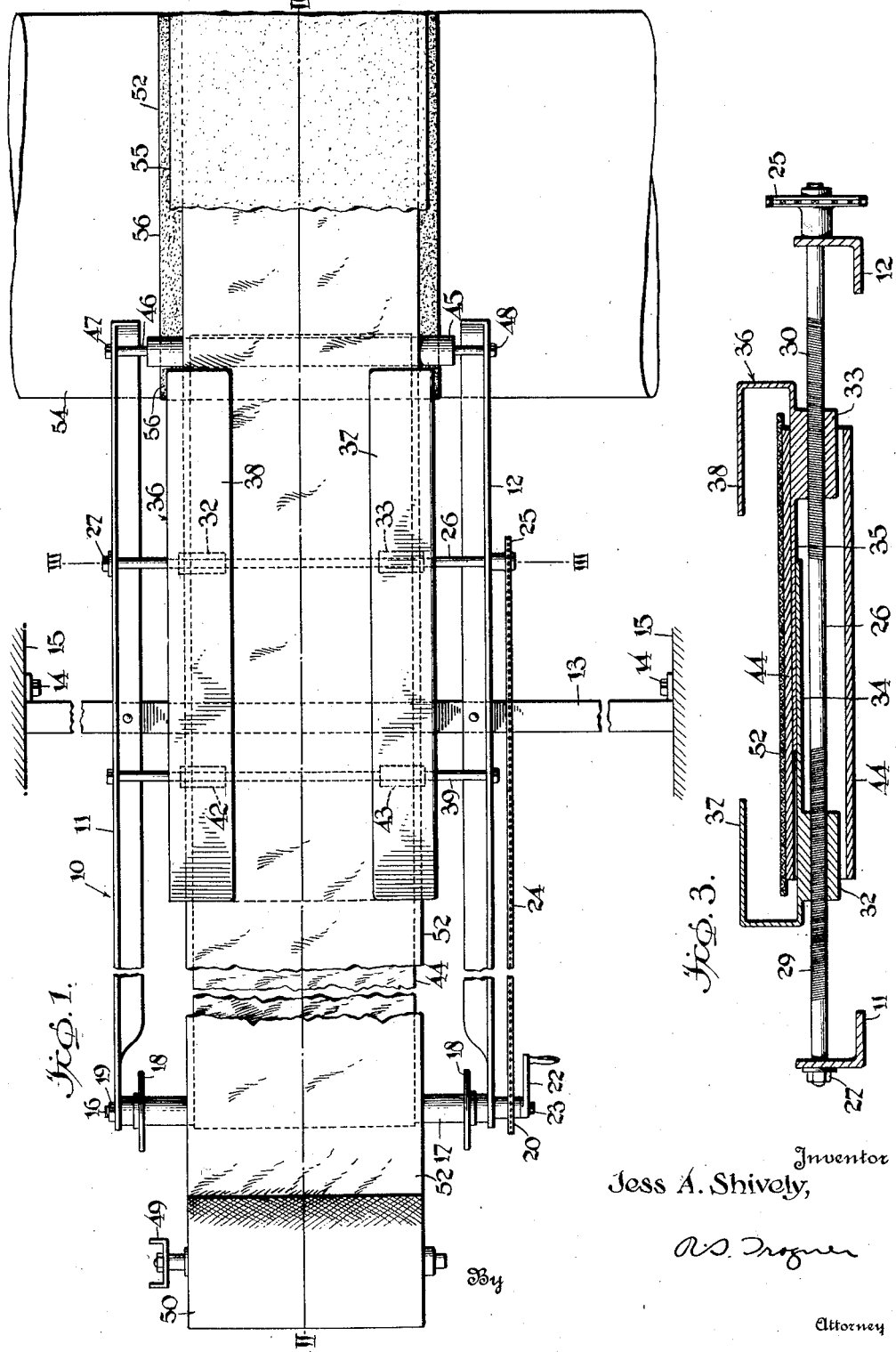

1,700,099

UNITED STATES PATENT OFFICE.

JESS A. SHIVELY, OF AKRON, OHIO, ASSIGNOR TO THE GOODYEAR TIRE & RUBBER COMPANY, OF AKRON, OHIO, A CORPORATION OF OHIO.

ATTACHMENT FOR CALENDERS.

Application filed February 27, 1926. Serial No. 91,069.

My invention relates to calenders employed in preparing rubber stock to be incorporated in pneumatic tire casings and the like and it has particular relation to an apparatus designed for the purpose of guiding strips of material between the rollers of such calenders.

One object of my invention is to provide an apparatus which will assist in preparing tire building stock in such manner that the tire building process is materially simplified.

Another object of my invention consists in providing an apparatus so constructed and arranged with respect to a calender that a fabric strip may be treated on each side with a cushion of rubber compound before it is placed upon a tire building machine.

Another object of my invention is to provide an apparatus which will guide a fabric strip of the type commonly called a "breaker strip" between the rollers of a calender in such manner that rubber cushioning elements may be calendered together with the breaker strip, thereby obviating the necessity of separately applying cushioning elements during the process of building pneumatic tire casings.

In the manufacture of pneumatic tire casings, a number of plies of rubberized fabric are applied upon a rotatable building core, a layer of rubber, commonly called a cushioning element is then applied, and a breaker strip composed of one or more strips of cord fabric is applied to the tread portion of the rubber cushioning element, prior to the application of the tire tread. Another cushioning element of rubber similar to the first is stitched over the breaker strip before the application of the tread. Thus three operations were necessary in building the complete breaker structure of a tire casing, which includes the breaker strip and the two cushioning elements.

My invention is directed primarily to the provision of a device which operates in conjunction with a calender to produce breaker strip stock, which is coated on both sides with rubber cushion elements, and is ready to be cut to proper lengths for incorporation into pneumatic tire carcasses, thus dispensing with at least two operations generally performed during the process of building a tire casing.

The device embodying my invention comprises a horizontal frame, one end of which extends toward the calender and is supported upon a portion of the calender frame. The frame is provided with a conveyor belt, which travels through a guide mounted on the frame of the device, and a breaker strip is fed from a stock roll to the conveyor belt until one end thereof is engaged between the rollers of the calender. Each roller carries a cushion strip which is firmly calendered to the respective side of the breaker as the calender rolls are rotated.

For a better understanding of my invention, reference may now be had to the accompanying drawings forming a part of this specification, of which:

Fig. 1 is a fragmentary plan view of an apparatus embodying my invention;

Fig. 2 is a longitudinal cross-sectional view of the apparatus illustrating the manner in which it is associated with a calender; the section being taken along the line II—II of the Fig. 1; and Fig. 3 is a cross-sectional view on an enlarged scale, illustrating adjustable features embodied in my invention, the view being taken substantially along the line III—III of Fig. 1.

In practicing my invention, I provide a frame 10 constructed of two angle members 11 and 12 mounted rigidly upon a transversely extending horizontal angle bar 13 which is bolted at its ends, as indicated at 14, to calender frame members 15. The adjacent ends of the angle members 11 and 12 are connected by a rod 16, which rotatably supports a roller 17, provided with flanges 18, the opposite ends of the roller abutting the respective angle members 11 and 12. One end of the rod is provided with a retaining nut 19, while the other end thereof, extending beyond the side of the frame 10, rotatably supports a sprocket gear wheel 20, which is adapted to be rotated manually by a crank arm 22, rigidly secured thereto and held in proper position on the rod by a nut 23.

A sprocket chain 24 is trained about the sprocket wheel 20 and about a second spaced sprocket wheel 25, the latter being rigidly secured to a transversely disposed rod 26, journaled adjacent its ends in the angle members 11 and 12, and held in place by means of a retaining nut 27.

As best shown in Fig. 3, the rod 26 is provided with reversely screw-threaded portions 29 and 30, respectively, extending through reversely screw-threaded lugs 32 and 33 formed integrally with or rigidly secured to two overlapping plates 34 and 35, the outer edges of which cooperate to constitute a guide 36. The plates are provided with inturned flanges 37 and 38, and in conjunction with the lower overlapping portions of the plates, impart to the guide a channel shape. In order to maintain the plates 34 and 35 in proper position with respect to the frame, a second transverse rod 39 spaced from and parallel to the rod 26, is secured to the angle members 11 and 12, and is slidably disposed through lugs 42 and 43, rigidly secured to the respective plates 34 and 35. By manually turning the crank arm 22, the sprocket gear rotates the rod 26 and consequently the threaded portion thereof operating within the lugs 32 and 33, causes the plates to be moved in opposite directions.

A conveyor belt 44 disposed over the roller 17 at one end of the frame 10, extends through the channel portion provided by the guide 36, and is disposed over a roller 45, rotatably mounted upon a rod 46 secured, as indicated at 47 and 48, to the other end of the frame. One end of the guide extends to a point adjacent the roller 45, but in such position as not to interfere with the operation of the conveyor belt 44 as it travels through the channel of the guide, and over the roller 45.

Adjacent one end of the frame 10, a reel support 49, secured in any convenient manner to the foundation or floor, which carries the calender is adapted to rotatably support a liner roll 50, the latter having a strip of breaker stock 52 rolled therein. The breaker stock is adapted to be positioned on the conveyor belt 44, and the roller 17 manually turned until the strip is conveyed through the guide 36 beyond the roller 45. Then the crank arm 22 is manipulated to turn the rod 26 in order that the plates 34 and 35 of the guide may be so adjusted relative to each other that the channel provided by the plate conforms to the width of the breaker stock. The end of the frame 10 supporting the roller 45 is disposed as near as possible to two calender rollers 53 and 54, which are adapted to calender strips of cushion rubber compound 55 and 56. By inserting the end of the breaker strip between strips of cushion rubber, the calender rollers press the strips into engagement with the breaker. At the side of the calender opposite to that at which the frame 10 is mounted, the treated breaker stock is wound upon suitable rollers (not shown), and is ready to be cut to proper lengths for incorporation into pneumatic tire casings.

It is to be understood that a number of devices, such as the one described in the foregoing paragraphs, may be employed for each calender if desired, as the conveyor belt and the guiding devices are relatively narrow and are adapted to be spaced along the lengths of the calender rollers.

From the foregoing description, it will be apparent that I have devised an apparatus, simple in its operation, and efficient in performing the functions of cooperating with a calender in applying rubber cushion strips to breaker stock employed in the construction of tire casings.

Although I have illustrated but one form which my invention may assume, and have described in detail but a single application thereof, it will be apparent to those skilled in the art, that it is not so limited but that various minor modifications and changes may be made therein without departing from the spirit of my invention or from the scope of the appended claims.

What I claim is:

1. An apparatus comprising an elongate frame, a guide comprising a plurality of overlapping plates mounted thereon, and means operated from a remote portion of the frame for relatively moving the separate parts of the guides.

2. An apparatus comprising an elongate frame, a guide comprising two over-lapping flanged plates, and means extending across the frame operatively connected to one end of the latter for relatively adjusting the plates.

3. An apparatus comprising an elongate frame, a guide including two over-lapping flanged plates, means extending across the frame operatively connected to the plates for relatively adjusting the latter, and a member extending across the frame slidably connected to each plate.

4. An apparatus comprising a frame, a guide including a plurality of overlapping elements forming a channel mounted on the frame, an endless belt so mounted on the frame that the belt is movable through the channel, and means for simultaneously moving the elements with respect to the belt.

5. An apparatus comprising a frame, a guide provided with a channel mounted on the frame, a roller support on the frame spaced from each end of the channel, an endless belt so associated with the roller supports that the belt is movable through the channel, and means operatively connected to one of the roller supports and to the guide for varying the size of the channel.

6. An apparatus comprising a frame, a guide provided with a channel mounted on the frame, a roller support on the frame spaced from each end of the channel, a conveyor belt so associated with the roller supports that the belt is movable through the channel, and a sprocket gearing operatively connected to one of the roller supports and to the guide for varying the width of the channel.

7. A web guiding attachment for a calender comprising an elongate frame for attachment to the frame of the calender, a guide including a plurality of overlapping elements forming a channel mounted on the frame, rollers journalled adjacent the ends of the frame, an endless belt trained about the rollers and traversing the channel and means carried by the frame for moving the elements to vary the size of the channel.

In witness whereof, I have hereunto signed my name.

JESS A. SHIVELY.